Nov. 6, 1928.

C. J. DUDLEY 1,690,722

COMBINED BASKET COVER AND HANDLE FASTENING MEANS

Filed Aug. 24, 1926

INVENTOR
Colon J. Dudley
By J. Wm. Ellis
ATTORNEY

Patented Nov. 6, 1928.

1,690,722

UNITED STATES PATENT OFFICE.

COLON J. DUDLEY, OF HAMBURG, NEW YORK.

COMBINED BASKET COVER AND HANDLE-FASTENING MEANS.

Application filed August 24, 1926. Serial No. 131,273

My invention relates in general to a combined basket cover and handle fastening means, and in particular to a cover fastening means for fruit baskets and a combined handle for such basket.

It is well known to those skilled in the art that in baskets used as fruit containers, it is very desirable to have the cover fastening means permanently attached to the basket when it is being filled and to provide such means which will keep the basket from bulging, thus preventing pilfering and loss of contents.

The principal object of my invention has been to provide a device in which the fastening means shall be permanently attached to the rim of the basket.

Another object has been to provide a handle for the basket which is engageable with the fastening means, whereby the basket may be prevented from bulging.

A further object of my invention has been to provide means of such a nature that the band at the top of the basket will be strengthened.

Another object has been to provide a fastening means which will hold the cover firmly down on the basket and positively prevent its shifting endwise or sidewise.

Moreover, my invention provides a convenient handle for the basket.

The above objects and advantages have been accompished by the device shown in the accompanying drawings, of which:

Figure 1:
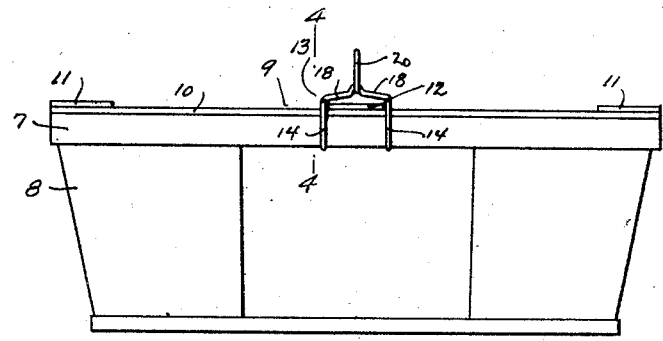
Fig. 1 is a side elevation of a fruit basket provided with my fastening means.
Figure 2:
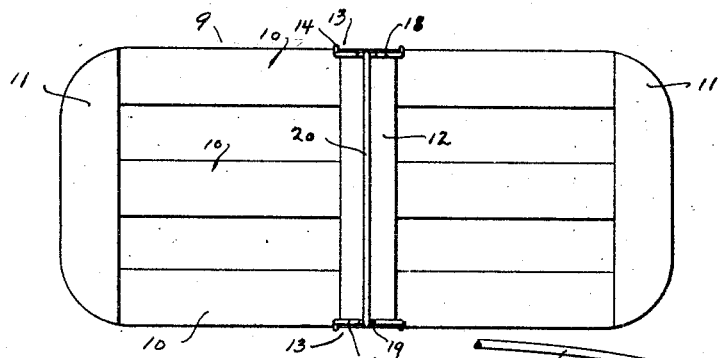
Fig. 2 is a plan view of the same.
Figure 4:
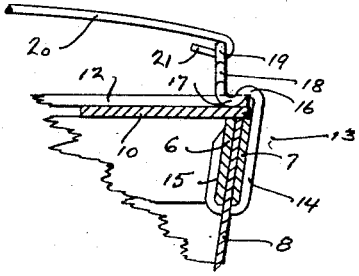
Fig. 4 is an enlarged, fragmentary, sectional view taken on line 4—4 of Fig. 1.
Figure 3:
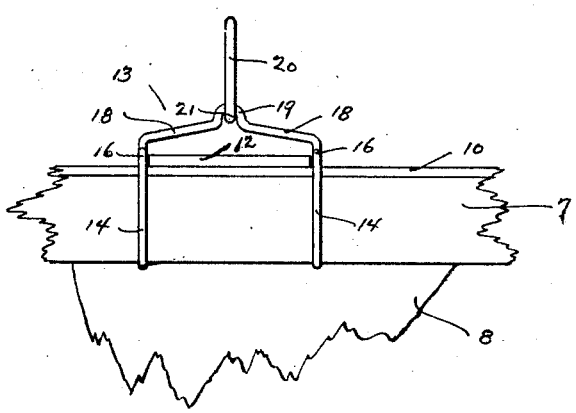
Fig. 3 is an enlarged, fragmentary, side elevation of the basket showing my fastening means.

My invention is applicable particularly to that type of fruit basket which is provided with a laterally arranged handle at its central portion. In the drawings 5 represents the basket which is provided with the usual inner reinforcing cleat 6 and outer reinforcing cleat 7, which are arranged on each side of the side wall 8 of the basket. The cover 9 of the basket is of the type made up of a plurality of longitudinal cleats 10, end lateral cleats 11, and a central lateral cleat 12.

My fastening means comprises a wire element 13, one arranged at each side of the basket and preferably midway the length thereof. Each of these wire elements comprises two side members 14 which are interspaced a distance slightly in excess of the width of the central lateral cover member 12. The members 14 extend down the outside of the basket and in contact with the outer reinforcing member 7, and they have their inner ends 15 extended through the side wall 8 of the basket and projected upwardy on the interior of the basket and in contact with the inner reinforcing strips 6. This formation serves to tightly bind the reinforcing members and side wall together and to securely fasten the wire element in place.

The portion 16 of the wire adjacent each of the side members 14 is bent inwardly and downwardly and then upwardly in Z-shaped formation, thus providing contact points 17. When in position, as shown in the drawings, these contact points bear tightly onto the top of the cover, being in contact with the side longitudinal strips 10, and one of them is arranged at each side of the central lateral strip 12, thus not only firmly holding the basket cover in place, but preventing longitudinal as well as lateral movement thereof. The portions 18 of the wire adjacent the portions 16 are bent inwardly toward each other and terminate in a ring portion 19 at the center of the element.

A wire handle 20 is provided at each end with a return bend which forms a hook 21. The handle is curved as shown in the drawings so that the distance between the hooks 21 may be increased by straightening the wire when it is to be assembled. While the wire elements are securely fastened to the top rim of the basket, it is obvious that there will be considerable resiliency, and when the basket has been filled, the cover 9 is slipped under the contact points 17 of the element at one side of the basket while the element at the other side is sprung outwardly so as to permit the cover to be brought down in contact with the top of the basket, whereupon the fastener at the side may be easily moved back to the position shown in the drawings. When the cover is in place and the fasteners are moved to the positions shown, the wire handle 20 is put into position by first engaging the hook 21 at one end with one of the elements 13 and drawing it over toward the element of the opposite side, whereupon it may be engaged with this element by a temporary straightening action of the wire which causes the length to increase sufficiently so as to permit the hook 21 at the free end to be looped into the ring member 19 of the element at that end. After the handle has been engaged, the resiliency of the wire from which it is formed will bring it back to its normal curved formation, which will cause the elements 13 to be drawn toward each other, and thereby securely hold the cover in place, as well as preventing the sides of the basket from bulging. It will be obvious that when the basket is being handled, the wire elements will be brought into firmer contact with the cover by reason of the weight of the contents of the basket. One large advantage of this construction is that the basket when produced by the factory and delivered to the consumer can be immediately put into use without further change or additional labor.

Obviously, some modifications of the details herein shown and described may be made without departing from the spirit of my invention or the scope of the appended claims, and I do not, therefore, wish to be limited to the exact embodiment herein shown and described, the form shown being merely a preferred embodiment thereof.

Having thus described my invention, what I claim is:

1. The combination with a basket and cover, the cover having a central slat, of cover fastening means, comprising a wire element arranged at each side of the basket, each element being provided with two Z-shaped portions, one arranged on each side of the central slat and engaging the cover, and a handle for connecting the fastening elements together.

2. The combination with a basket of cover fastening means, comprising two wire elements secured to the upper edge of the basket and each provided with two Z-shaped portions engageable with the cover, the outside vertical portion of each of the elements being free to move forwardly and backwardly upon the application of hand pressure, so as to move the Z-shaped portions into and out of engagement with the cover.

3. The combination with a basket and cover, the cover having a central slat, of cover fastening means, comprising a wire element arranged at each side of the basket, each element being provided with two Z-shaped portions, one arranged on each side of the central slat and engaging the cover, the outside vertical portion of each of the wire elements being free to move forwardly and backwardly upon the application of hand pressure, so as to move the Z-shaped portion into and out of engagement with the cover, and a handle for connecting the fastening elements together.

In testimony whereof, I have hereunto signed my name.

COLON J. DUDLEY.